United States Patent
De Visscher et al.

(10) Patent No.: US 9,753,145 B2
(45) Date of Patent: Sep. 5, 2017

(54) DOSIMETRIC METHOD

(71) Applicant: Nitto Denko Corporation, Osaka (JP)

(72) Inventors: Geofrey De Visscher, Chexbres (CH); Nicolas Schüwer, Lausanne (CH)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 15/029,429

(22) PCT Filed: Oct. 28, 2014

(86) PCT No.: PCT/EP2014/073091
§ 371 (c)(1),
(2) Date: Apr. 14, 2016

(87) PCT Pub. No.: WO2015/063072
PCT Pub. Date: May 7, 2015

(65) Prior Publication Data
US 2016/0231434 A1    Aug. 11, 2016

(30) Foreign Application Priority Data
Oct. 28, 2013 (EP) .................................. 131900516

(51) Int. Cl.
*G01T 1/04* (2006.01)
(52) U.S. Cl.
CPC ...................... *G01T 1/04* (2013.01)
(58) Field of Classification Search
CPC ........................................................ G01T 1/04
See application file for complete search history.

(56) References Cited

U.S. PATENT DOCUMENTS

| 5,206,118 | A | 4/1993 | Sidney et al. |
| 6,806,478 | B1 * | 10/2004 | Hatfield ..................... 250/492.1 |
| 8,115,182 | B1 | 2/2012 | Patel |
| 2012/0205591 | A1 * | 8/2012 | Patel ......................... 252/408.1 |
| 2012/0313268 | A1 * | 12/2012 | Bianchi et al. ................. 264/1.1 |
| 2016/0033653 | A1 * | 2/2016 | Becker ....................... 250/474.1 |

FOREIGN PATENT DOCUMENTS

JP    2009-142404 A    7/2009

OTHER PUBLICATIONS

European Search Report for Application No. 13190516.8 dated Mar. 18, 2014.
(Continued)

*Primary Examiner* — David Porta
*Assistant Examiner* — Hugh H Maupin
(74) *Attorney, Agent, or Firm* — Wolf, Greenfield & Sacks, P.C.

(57) ABSTRACT

The present invention relates to a method for detecting and optionally quantifying exposure to ionizing radiation and applications thereof. More particularly, the invention relates to the detection and/or quantification of ionizing radiation exposure by detecting the colour change of one or more dianhydrohexitol compounds, such as isosorbide, caused by ionizing radiation. It also relates to the use of dianhydrohexitol compounds for detecting exposure to irradiation, to a system and kit that may be used for such purposes, and to a method for making sterilized objects, which also relies on the colour change induced by ionizing radiation.

20 Claims, 10 Drawing Sheets

(56) References Cited

OTHER PUBLICATIONS

International Search Report and Written Opinion for Application No. PCT/EP2014/073091 dated Mar. 6, 2015.
Scherz et al., Verwendung von Mannit zur Dosimetrie von Gammastrahlung. Use of Mannitol in the dosimetry of gamma radiation. Kerntechnik. 1970;12(11):501-503.
EP 13190516.8, Mar. 18, 2014, European Search Report.
PCT/EP2014/073091, Mar. 6, 2015, International Search Report and Written Opinion.

* cited by examiner

DOSIMETRIC METHOD

CROSS-REFERENCE TO RELATED APPLICATIONS

This application is the National Phase under 35 U.S.C. §371 of PCT International Application No. PCT/EP2014/073091, filed Oct. 28, 2014, which claims the priority of EP Application No. 13190516.8, filed Oct. 28, 2013, the entire contents of the aforementioned applications are hereby incorporated herein by reference.

1. FIELD OF THE INVENTION

The present invention relates to a method for detecting and optionally quantifying exposure to ionizing radiation and applications thereof. More particularly, the invention relates to the detection and optional quantification of ionizing radiation exposure by monitoring property changes in dianhydrohexitol compounds that have been exposed to ionizing radiation.

2. BACKGROUND OF THE INVENTION

Ionizing radiation is employed in a wide variety of medical, industrial and agricultural processes. Some typical processes include radiation therapy of biological subjects or matter (e.g. people, animals, blood), alteration of material properties (e.g. polymerization, cross-linking), quality checking (e.g. inspecting welds, measuringthickness of microelectronic wafers), security scanning (e.g. X-ray detectors), food and crop irradiation (e.g. to grade and sort food, maintain desired properties or remove pests), as well as the sterilization of materials in general. Exposure to ionizing radiation can also occur naturally (e.g. radon gas), accidently (e.g. radioactive spill) or as part of the accepted occupational hazards of certain professions (e.g. miners, radiologists, medical technologists, nuclear plant operators, research scientists, pilots and cabin crew). Regardless of how a person or object is exposed to ionizing radiation, there is often a need to verify that exposure has occurred and to quantify that exposure, albeit acute or chronic.

Radiation dosimeters are used to measure an individual's or an object's exposure to ionizing radiation. A dosimeter is a material or device that, when exposed to ionisation radiation, exhibits a quantifiable change in a physical or chemical property of the material or device which can be related to the dose in a given material using appropriate analytical techniques.

A number of materials have been described that exhibit a dose-dependent property change after exposure to ionizing radiation. For example, the Fricke dosimeter, also called ferrous sulphate dosimeter, is based on the oxidation of ferrous ions ($Fe^{2+}$) to ferric ions ($Fe^{3+}$) in water or aqueous gels with a corresponding change in paramagnetic or optical properties that may be measured using nuclear magnetic resonance (NMR) relaxation rates or optical techniques. A major limitation of Fricke solution-based and gel-based systems is the continual post-irradiation diffusion of ions resulting in a blurred dose distribution, particularly when these are used for three-dimensional dosimetry.

Certain crystalline materials (e.g. calcium fluoride, lithium fluoride) exhibit thermoluminescence in response to ionizing radiation. As the radiation interacts with the crystal it causes electrons in the crystal's atoms to jump to higher energy states, where they stay trapped due to intentionally introduced impurities in the crystal. Heating the crystal causes the excited electrons to drop back to their ground state, whereupon a photon is released and can be detected. Since the excited electrons tend to drop back to their ground state over time (so-called fading), thermoluminescence materials possesses a limited shelf life after which dosimetric information can no longer be obtained.

Another material suitable for dosimetry is alanine, an amino acid, which forms radicals upon exposure to ionizing radiation (see e.g. US 2005/0061991 A1). The radicals that are produced are stable for at least several hours. This is mainly due to the inhibition of radical-radical recombination in the crystalline structure of the material where the migration of large molecule fragments is largely prevented. The concentration of formed radicals can be measured using an electron paramagnetic resonance (EPR) spectrometer to determine the amount of absorbed ionizing radiation. Although alanine is widely used as a dosimetry material, the detection of its radicals requires the use of cumbersome and expensive equipment.

Further materials that are reported as being suitable for ionizing radiation dosimetry include radiation sensitive, colour changing diacetylene-type compounds such as R—C≡C—C≡C—R' where R and R' are substituents groups (see U.S. Pat. No. 8,115,182 B1), mannitol (see Scherz and Grünewald, Kerntechnik, 1970, v. 12(11), pp. 501-503), and acid-sensitive leuco dyes dispersed in a halogen-containing polymer (see U.S. Pat. No. 5,206,118).

The present invention aims to address disadvantages associated with known dosimetric materials and devices such as those described above.

3. SUMMARY OF THE INVENTION

This invention provides a method for detecting and optionally quantifying a dose of ionizing radiation. The invention is based on the finding that a colour change is observed when a dianhydrohexitol is exposed to ionisation radiation. The colour change is visible to the human eye. The colour change can also be observed using colorimetric, chromometric techniques or UV-visible (UV-vis) spectroscopy. More importantly, it has been found that the colour change has a linear dependency on the radiation dosage. This allows one to correlate the colour change with the amount of ionizing radiation absorbed by the material.

In one aspect, the present invention provides for the use of a dianhydrohexitol or dianhydrohexitol-containing composition for detecting or quantifying exposure to ionizing radiation.

In a further aspect the invention provides methods for detecting and optionally quantifying exposure to ionizing radiation. An exemplary method of the invention can comprise the steps: (a) providing a dianhydrohexitol or dianhydrohexitol-containing composition wherein the dianhydrohexitol is one or more of isosorbide, isomannide and isoidide; (b) exposing the dianhydrohexitol to ionizing radiation, thereby effecting a colour change in the dianhydrohexitol; (c) detecting the colour change in the dianhydrohexitol; and optionally (d) quantifying the dose of ionizing radiation absorbed by the dianhydrohexitol on the basis of the colour change.

A further exemplary method comprising the steps: (a) providing a dianhydrohexitol or dianhydrohexitol-containing composition, wherein the dianhydrohexitol is one or more of isosorbide, isomannide and isoidide; (b) exposing the dianhydrohexitol or dianhydrohexitol-containing composition to ionizing radiation, thereby producing a free radical; (c) detecting a free radical in the dianhydrohexitol or dianhydrohexitol-containing composition by electron paramagnetic resonance (EPR); and optionally (d) quantifying the dose of ionizing radiation absorbed by the dianhydrohexitol or dianhydrohexitol-containing composition on the basis of the EPR signal.

In a further aspect the invention provides systems for detecting and optionally quantifying exposure to ionizing radiation. An exemplary system comprises: a dianhydrohexitol or dianhydrohexitol-containing composition wherein the dianhydrohexitol is one or more of isosorbide, isomannide and isoidide; and a means to determine if (i) the dianhydrohexitol has been exposed to a pre-defined dose of ionizing radiation and optionally (ii) the quantity of the exposure that has occurred.

In a further aspect the invention provides kits for detecting and optionally quantifying exposure to ionizing radiation. An exemplary kit of the invention comprises: a dianhydrohexitol or dianhydrohexitol-containing composition wherein the dianhydrohexitol is one or more of isosorbide, isomannide and isoidide; and a means to determine if (i) the dianhydrohexitol or dianhydrohexitol-containing composition has been exposed to a pre-defined dose of ionizing radiation and optionally (ii) the quantity of the exposure that has occurred.

In a further aspect the invention provides processes for making sterilized objects. An exemplary process comprises the steps: (a) providing an object to be sterilized; (b) exposing the object and a dianhydrohexitol or dianhydrohexitol-containing composition to ionizing radiation wherein the dianhydrohexitol is one or more of isosorbide, isomannide and isoidide; (c) detecting the colour change in the dianhydrohexitol or dianhydrohexitol-containing composition; (d) quantifying the dose of ionizing radiation absorbed by the dianhydrohexitol or dianhydrohexitol-containing composition on the basis of the colour change; (e) confirming that the dose is 5 kGy or higher, preferably 20 kGy or higher, more preferably 25 kGy or higher; and (f) marking the object or packaging containing the object to indicate that it has been sterilized.

4. BRIEF DESCRIPTION OF THE DRAWINGS

5 DETAILED DESCRIPTION OF THE INVENTION

Figure 1:
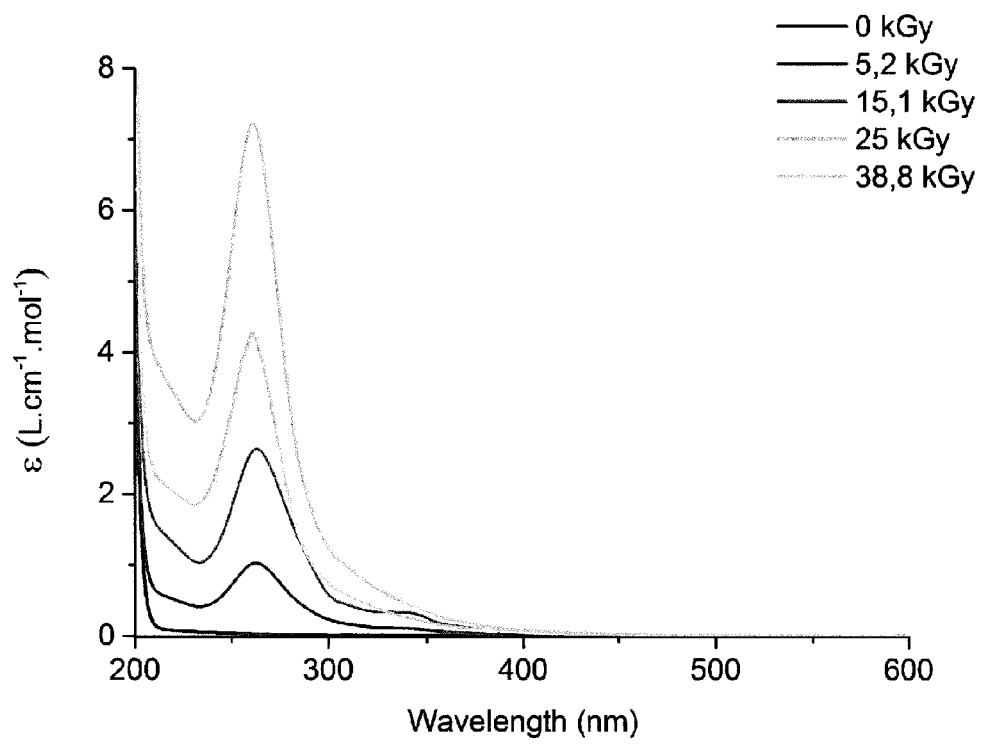
FIG. 1 depicts the UV-vis molar absorbance spectra of isosorbide (in aqueous solution) after different doses of X-ray irradiation.
Figure 2:
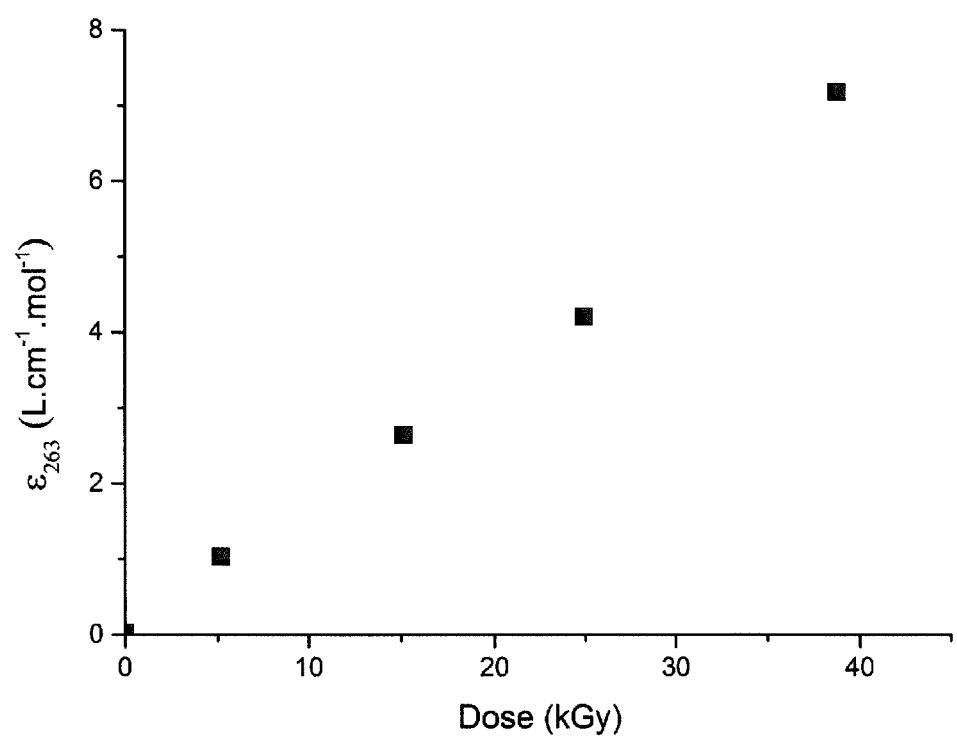
FIG. 2 depicts the intensity of the UV-vis molar absorbance at 263 nm for isosorbide (in aqueous solution) after different doses of X-ray irradiation.

When a dianhydrohexitol is exposed to ionizing radiation a colour change is observed. For example, when isosorbide, isoidide or isomannide are exposed to X-ray or γ-ray irradiation, a colour change from white to pale pink-orange is observed. The intensity of this colour change increases as the dose of the radiation is increased. If the exposed material is dissolved for instance in water to form an aqueous solution and examined with UV-vis spectroscopy, a new peak at around 263 nm for the exposed isosorbide can be observed that was not present before (FIG. 1). A new peak at about 263 nm was also observed for isomannide and isoidide. Furthermore, the intensity of this peak increases linearly with the radiation dosage (FIG. 2). This linear change in intensity is reproducible and is observed across a wide range of radiation doses. The colour change is also stable—after 8 months of storage at room temperature only a very slight decrease in colour intensity and UV-vis absorbance intensity was observed. Further studies have shown that the colour change is stable for at least 20 months.

5.1 Dianhydrohexitol

The dianhydrohexitols (also known as isohexides) for use in the present invention are isosorbide, isomannide, and isoidide. The term 'dianhydrohexitol' is to be understood as meaning isosorbide, isomannide, or isoidide, whether used alone or as a mixture of two or three of these isomers. Isosorbide and isomannide are the preferred dianhydrohexitols for all aspects of the present invention, with isosorbide being the most preferred dianhydrohexitol of the three. These compounds are commercially available and their synthesis is widely reported (e.g. 13$^{th}$ Ed. Merck index, Entry 5245; GB 600870; U.S. Pat. Nos. 3,160,641; 3,023,223; WO 2013/125950 A1).

For the present invention it is preferable that the dianhydrohexitol is used in a pure form to increase the sensitivity of the compound for detecting and optionally quantifying ionizing radiation. The dianhydrohexitol preferably has a purity of 99 wt. % or more, and more preferably 99.5 wt. % or more. If the dianhydrohexitol is less pure than this there is an increased possibility that an impurity is present that absorbs light in the same wavelength range that is used to detect the colour change of the dianhydrohexitol after ionizing radiation exposure. By minimising the amount of impurity it is possible to increase the sensitivity of the compound for detecting and optionally quantifying ionizing radiation, particularly when the impurity absorbs light in the same wavelength range that is used to detect the colour change. For example, the isosorbide that was used to generate the data in FIG. 1 had a purity of 99.5 wt. %. It can be seen from FIG. 1 that the isosorbide absorbed little or no light at 263 nm before ionizing exposure (0 kGy) thus maximizing the change in absorption coefficient after the various exposures. If the dianhydrohexitol to be used in the invention is a mixture of two or three of the isomers isosorbide, isomannide, or isoidide, then the purity of 99 wt. % or more, or 99.5 wt. % or more refers to the combined amount of isosorbide, isomannide and isoidide. When EPR is used as a means for detecting and optionally quantifying ionizing radiation then the presence of light-absorbing impurities has less impact on the sensitivity of the detection and optional quantifying method, particularly when such impurities do not impede detection or measurement of the EPR signal. In this case the dianhydrohexitol preferably has a purity of 90 wt. % or more, preferably 95 wt. % or more, more preferably 99 wt. % or more, and even more preferably 99.5 wt. % or more.

5.2 Solid as Well as Liquid Form

Figure 3:
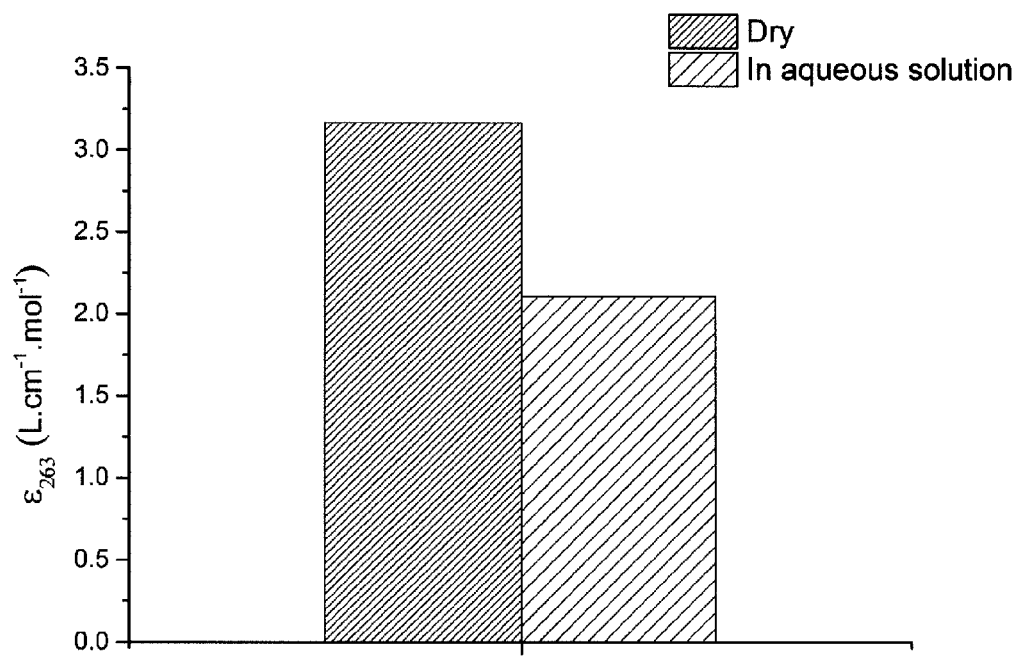
FIG. 3 depicts the molar absorbance at 263 nm after the γ-ray irradiation (25.4 kGy) of isosorbide in both a solid and liquid (1M aqueous solution) form.

The dianhydrohexitol for use in the present invention can be provided in the form of a solid or a liquid. For example, the dianhydrohexitol can be provided in the form of a powder. It can also be pressed into pellets, tablets, rods, discs, or beads of any desired shape or size. The dianhydrohexitol can also be dissolved in a suitable solvent such as water. In this respect reference is made to FIG. 3 which shows the change in absorbance at 263 nm after the γ-ray irradiation (25.4 kGy) of isosorbide in both a solid form (crystalline powder) and a liquid form (1M aqueous solution). A colour change is detected in both cases but the change in intensity is greater for the solid form. It is preferable that the dianhydrohexitol is provided in a solid form for use in the present invention. The term 'solid form' means that the dianhydrohexitol or composition comprising the dianhydrohexitol is a solid (e.g. pellet, film, etc.). it is more preferable that the dianhydrohexitol is provided in a crystalline form. The term 'crystalline form' encompasses a composition comprising crystals of dianhydrohexitol.

5.3 Composition Comprising Dianhydrohexitol

The dianhydrohexitol can be used on its own or with additional components (i. e. as a dianhydrohexitol-containing composition). For example, if the dianhydrohexitol is to be pressed into pellets, tablets, rods, discs, or beads then tableting or pelleting aids, fillers, binders and the like can be included in the composition. When choosing additional components it is preferable to choose those components that absorb little or no light in the same wavelength range that is used to detect the colour change of the dianhydrohexitol after ionizing radiation exposure. If additional components are used, which absorb light in the detection wavelength range, such absorption should not alter with irradiation. In this case, said additional components can be used as internal control. It is also preferable to choose additional components that do not interfere with the colour change reaction of the dianhydrohexitol upon exposure to ionizing radiation. By way of example, the following binder and filler components can be used in the present invention: calcium carbonate, calcium sulphate, calcium silicate, calcium stearate, chitin, chitosan, dibasic calcium phosphate dihydrate, glyceryl pahnitostearate, magnesium stearate, stearic acid, zinc stearate, sodium stearyl fumarate, ascorbyl palmitate, micronized or non-micronized talc, silica in various forms such as fumed silica, colloidal silica and precipitated silica and silica gel, sodium aluminum silicate, mineral calcium with stearic acid, glyceryl monostearate, glyceryl triacetate, hydroxypropyl methylcellulose phthalate HPMCP), powdered cellulose, microcrystalline cellulose, maltodextrin, octadecanoic acid, polyethylene glycol, shellac and especially purified shellac, soapstone, sodium benzoate, sodium lauryl sulfate, titanium dioxide, boric acid, sodium chloride, mineral oil and hydrogenated vegetable oil, kaolin, magnesium aluminium silicate, magnesium carbonate, magnesium oxide, and mixtures of any two or more thereof.

When the dianhydrohexitol is provided in the form of a dianhydrohexitol-containing composition the total amount of dianhydrohexitol in the composition might fall below 99 wt. % when additional components are included. Nevertheless, it is still preferable to use a dianhydrohexitol having a purity of 99 wt. % or more, and more preferably 99.5 wt. % or more to prepare the dianhydrohexitol-containing composition: this ensures that any impurities in the dianhydrohexitol are kept to a minimum thereby increasing the sensitivity of the whole composition for detecting and optionally quantifying ionizing radiation. The total amount of dianhydrohexitol in the dianhydrohexitol-containing composition is preferably at least 50 wt. %, more preferably at least 80 wt. % and even more preferably at least 90 wt. % based on the weight of the whole composition.

Referring again to the prior art, when alanine is used as a dosimeter a key element in the choice of additional components (such as a binder or filler) is that the additional component must not form free radicals that would interfere with the alanine EPR signal after exposure to ionizing radiation. The present invention overcomes this problem in one respect because the ionizing radiation dose can be determined by visual or colorimetric means which avoids this problem altogether. This greatly increases the choice of additional components that can be used together with the dianhydrohexitol as compared to traditional dosimeters based on alanine. This in turn greatly increases the solid and liquid forms that the dianhydrohexitol can be provided in.

The present invention is particularly suited to film dosimetry as well as two-dimensional (2D) and three-dimensional (3D) dosimetry. In this case the composition comprising the dianhydrohexitol contains at least a polymer as an additional component. For instance, the composition can be formed from a translucent or transparent polymer that contains a dianhydrohexitol that is homogeneously and uniformly dispersed therein. Upon exposure to ionizing radiation, a colour change in the polymer can be observed. In this sense the term 'transparent or translucent' means that the polymer can be examined visually or by any colorimetric, chromometric or UV-vis. spectroscopic means to determine if an exterior or interior part of the polymer has been subject to ionizing radiation. The 2D or 3D dosimetric map thus formed is representative of the energy field to which the polymer has been exposed and can be quantified at high spatial resolution, thereby providing an accurate, stable, storable record in two and three dimensions of the radiation exposure.

The transparent or translucent polymer can be selected from a set of polymeric materials generally known as optical plastics. This set of materials includes, but is not limited to, acrylics (for example: polyacrylonitrile, and the family of ethylenelmethacrylic acid ionomers known as the Surlyns™), polystyrene (known as Dylene™, Styron™, and Lustrex™), polyacetal (known as Delrin™ and Ultraform™), cyclic olefin copolymer (COC, known as Topaz™ and Zeonor™), polycarbonate (known as Lexan™ and Merlon™), epoxy resins, silicones and siloxanes, polymethylpentene (TPX™), polyester (known as Mylar™), polysulfone (known as Udel™), and polyurethane. This set of materials also includes copolymers (for example, styrene acrylonitrile, known as Lustran™ and Tyril™), terpolymers (for example acrylonitrile, butadiene, styrene), and blends of two or more optical plastics. Polystyrene and co-polymers of styrene are preferred polymers. As before, when choosing a polymer as the additional component in the composition it is preferable to choose a polymer that absorbs little or no light in the same wavelength range that is used to detect the colour change of the dianhydrohexitol after ionizing radiation exposure.

The composition comprising the polymer and dianhydrohexitol can be fabricated by, for instance, admixing and uniformly dispersing a dianhydrohexitol (e.g. crystalline isosorbide) into a melt of the polymer followed by a step of cooling and solidifying within a mold to provide a solid molded product. The polymer can be melt-extruded to form films or fibers or any other desired shape. The dianhydrohexitol can be provided in the form of a badge, tape or fabric (e.g. woven or non-woven).

Alternatively, the composition comprising the polymer and dianhydrohexitol can be fabricated by admixing and uniformly dispersing a dianhydrohexitol (e.g. crystalline isosorbide) into a solution of the polymer in an appropriate solvent, followed by steps of evaporating and solidifying within a mold to provide the solid molded product. In the case of a film the mixture can be first coated on a suitable substrate before evaporating the solution. Alternatively, one or more chemical precursors to the polymeric product, such as monomers, are mixed with the dianhydrohexitol and, if needed, one or more polymerization catalysts, to provide a mixture which is placed into molds or coated on a substrate and allowed to polymerize under controlled conditions, thereby providing the dianhydrohexitol in a solid form.

If provided in a solid form, the dianhydrohexitol or composition comprising a dianhydrohexitol can be sealed from the environment. The sealing means should be such that it allows ionizing radiation to penetrate to the dianhydrohexitol or dianhydrohexitol-containing composition. Sealing from the environment provides resistance to contamination and serves to protect the dianhydrohexitol (or dianhydrohexitol-containing composition) from exposure to excessive moisture. This can be advantageous if the dianhydrohexitol is used to quantify ionizing radiation as it improves the accuracy and reliability of the final results as contamination (e.g. absorption of water) is reduced. The protection can be in the form of a container such as a glass or plastic ampule so long as the walls of the container allow ionizing radiation to pass into the interior of the container. The protection can be in the form of packaging or a protective overcoat layer. If present, a primary requirement of the packaging or overcoat layer is that it allows the penetration of ionizing radiation into the dianhydrohexitol (or dianhydrohexitol-containing composition). If the overcoat layer is not translucent or transparent to visible light it is removed after ionizing exposure so that the colour change can be inspected. Typical polymers for the overcoat layer include acrylates, methacrylates, cellulosics such as cellulose acetate, polyesters, polyurethanes, and halogen-containing polymers and copolymers. If the dianhydrohexitol is provided as a solution then it is preferable that the container or packaging containing the solution is sealed to reduce evaporation of the solvent.

The dianhydrohexitol, or composition comprising a dianhydrohexitol, may be arranged or designed to create a message in words, symbols, codes or other patterns to alert a user that exposure to ionizing radiation has occurred.

5.4 Method for Detecting and Optionally Quantifying Exposure

One method for detecting and optionally quantifying exposure to ionizing radiation comprises the steps of (a) providing a dianhydrohexitol or dianhydrohexitol-containing composition, wherein the dianhydrohexitol is one or more of isosorbide, isomannide and isoidide; (b) exposing the dianhydrohexitol to ionizing radiation, thereby effecting a colour change in the dianhydrohexitol; (c) detecting the colour change in the dianhydrohexitol; and optionally (d) quantifying the dose of ionizing radiation absorbed by the dianhydrohexitol on the basis of the colour change.

A further method for detecting and optionally quantifying exposure to ionizing radiation, comprises the steps: (a) providing a dianhydrohexitol or dianhydrohexitol-containing composition, wherein the dianhydrohexitol is one or more of isosorbide, isomannide and isoidide; (b) exposing the dianhydrohexitol or dianhydrohexitol-containing composition to ionizing radiation, thereby producing a free radical; (c) detecting a free radical in the dianhydrohexitol or dianhydrohexitol-containing composition by electron paramagnetic resonance (EPR); and optionally (d) quantifying the dose of ionizing radiation absorbed by the dianhydrohexitol or dianhydrohexitol-containing composition on the basis of the EPR signal.

The dianhydrohexitol can be provided on its own or as part of a composition such as described previously. Preferably the dianhydrohexitol is isosorbide, most preferably in crystalline form. The ionizing radiation that is detected and/or quantified includes X-rays, γ-rays, neutrons, alpha particles, beta particles, and other charged particles (e.g. protons for radiotherapy). The amount of ionizing radiation that the dianhydrohexitol is exposed to is not limited so long as a colour change can be observed. FIG. 2 shows that a linear change in colour intensity is observed across a wide range of radiation doses. The dianhydrohexitol of the invention is preferably used to detect ionizing radiation at a dose of 500 Gy and above. More preferably, the dianhydrohexitol of the invention is used to detect ionizing radiation at a dose of 1 kGy to 100 kGy, preferably 5 kGy to 75 kGy, more preferably 15 kGy to 50 kGy, and more preferably 25 kGy to 40 kGy. When used in a sterilization process, the dianhydrohexitol of the invention is used to detect an amount of ionizing radiation sufficient to cause sterilization, typically 25 kGy and above.

The dianhydrohexitol or dianhydrohexitol-containing composition is placed in, on or near an object whose exposure to ionizing radiation is to be detected or monitored. If necessary, multiple dosimeters can be placed in, on or near (c.a. around) the object. For example, in the case that a pallet of goods is to be sterilised, the dianhydrohexitol or dianhydrohexitol-containing composition can be placed towards the centre of the pallet as well as at the periphery of the pallet, In the case of a person or animal the dianhydrohexitol-containing composition can be incorporated into a badge, tape or fabric to be worn by that person or animal.

When the dianhydrohexitol is exposed to ionizing radiation a colour change is observed. In the present invention the term 'colour change' encompasses the appearance, disappearance or shift of an absorption band in the region of 220 nm to 600 nm, as well as the increase or decrease of the extinction coefficient for any wavelength in the region of 220 nm to 600 nm. For example, referring to FIG. 1, the appearance of a band at 263 nm after a dose of 5.2 kGy of ionizing radiation represents a colour change according to the invention. The increase in the extinction coefficient of the band at 263 nm for progressively higher doses of ionizing radiation also represents a colour change. While the absorption band in FIG. 1 has a $\lambda_{max}$ at around 263 nm, this may shift depending on the solvent used or the form (e.g. polymer film) of the dianhydrohexitol. If a device such as a UV-vis spectrometer, colorimetric or chromometric device is used to detect the colour change, then the colour change can be detected anywhere in the region of 220 nm to 600 nm, preferably 230 nm to 400 nm, more preferably 240 nm to 300 nm, and even more preferably 250 nm to 270 nm. According to one preferred embodiment, detection of the colour change means determining the change in extinction coefficient at a predetermined wavelength selected within one of the above wavelength ranges. Naturally, if the colour change is detected visually then the colour change is detected in the visual spectrum.

The change in colour can be detected by any means that is capable of detecting the appearance, disappearance or shift of an absorption band in the region of 220 nm to 600 nm, or the increase or decrease of the extinction coefficient for any wavelength in the region of 220 nm to 600 nm. For example, a tristimulus colorimeter, a spectrophotometer, a spectrocolorimeter, or a densitometer may be used for monitoring wavelength changes in the visible spectrum. A UV detector may be used for monitoring wavelength changes in the UV spectrum. Preferably a UV-vis spectrometer is used for monitoring the colour change. The change in colour can also be detected visually, e.g. by inspecting the exposed dianhydrohexitol or dianhydrohexitol-containing composition. Alternatively, or additionally, the detection and optional quantifying of exposure to ionizing radiation can be performed on the basis of the appearance of an electron paramagnetic resonance (EPR) signal after exposure of the dianhydrohexitol to ionizing radiation.

The exposed dianhydrohexitol or dianhydrohexitol-containing composition may be probed directly to detect the colour change or EPR signal. For example, if the dianhydrohexitol or dianhydrohexitol-containing composition is in the form of a pellet or a film then it may be probed directly by a tristimulus colorimeter, a spectrophotometer, a spectrocolorimeter, densitometer or EPR. Alternatively, the dianhydrohexitol or dianhydrohexitol-containing composition may be subjected to one or more processing steps before the step of detecting the colour change. For example, the dianhydrohexitol or dianhydrohexitol-containing composition may be dissolved in a suitable solvent and then probed as discussed above.

If the dianhydrohexitol or dianhydrohexitol-containing composition is provided in a form such that it is sealed from the environment (e.g. in a container) then the sealing means may be partly or wholly removed to allow inspection or further processing of the exposed dianhydrohexitol or dianhydrohexitol-containing composition. If the dianhydrohexitol or dianhydrohexitol-containing composition is provided in a solid form within a container, after the irradiation process a predefined amount of solvent can be added to the container to dissolve the dianhydrohexitol. Thereafter a sample of the dianhydrohexitol solution can be taken and examined by a colorimetric or chromometric means. Alternatively, if the walls of the container are transparent to light in the wavelength region of detection then the container may be in a form suitable (e.g. a cuvette or a tube) for direct insertion into an colorimetric analytical device such as a spectroscopic (e.g. UV/vis, colorimetric, etc.) or EPR device. It is preferably that the container is made from a material that does not undergo a colour change when exposed to ionisation radiation. In another embodiment the sealed container may additionally contain a solvent that is separated from the dianhydrohexitol during the irradiation process but made to come into contact with the dianhydrohexitol after the irradiation process to dissolve it. For example, dianhydrohexitol may be stored in a closed glass ampule that itself is contained within a flexible container containing a solvent. Bending the flexible container causes the glass ampule to break so that the dianhydrohexitol is dissolved in the solvent. As discussed above, a sample of the dianhydrohexitol solution can then be taken and examined by colorimetric, chromometric or spectrometric means or alternatively the container may be directly inserted into a colorimetric, chromometric or UV-vis spectrometric analytical device. The advantage of this system is that the user does not need to aliquot a predefined amount of solvent. This increases the convenience and accuracy of the measurement.

Detection of a colour change means that exposure to ionisation radiation has occurred. For some applications just this information may be sufficient. The step of quantifying the dose of ionizing radiation absorbed by the dianhydrohexitol is done by comparing the colour change of the exposed dianhydrohexitol or dianhydrohexitol-containing composition to a reference. A reference is prepared by subjecting a representative sample of the dianhydrohexitol or dianhydrohexitol-containing composition to a known dose of ionisation radiation and observing the colour change. A representative sample is a sample that is expected to absorb ionisation radiation to the same extent as the sample being tested (e.g. same shape, size, density, etc.). The colour change of the sample and the reference can be compared directly.

Alternatively, the colour change of the reference can be recorded (e.g. as one or more UV-vis data points, or using the Pantone Colour Matching System, Adobe RGB colour space, CIE 1931 RGB and XYZ colour spaces, and such like) for later comparison with samples where the quantity of exposed ionizing radiation is unknown. If the sample being tested exhibits the same colour as the reference then it can be assumed that the sample received the same dose of radiation as was used to prepare the reference. If a change in EPR signal is used to quantify the ionizing radiation dose, then the signal can be compared to an EPR reference signal. This method is particularly suited for determining a minimum exposure dose. For instance, if the sample being tested exhibits the same or a more intense colour than the reference (e.g. higher absorption coefficient, enhanced chroma, etc.) then it can be assumed that the sample received at least the same dose as the reference, if not more. This is particularly useful where one is only interested in determining if a pre-defined minimum exposure has occurred (e.g. worker safety, sterilisation procedures, etc.). For the purposes of this invention it is to be understood that the step of quantifying the dose of ionizing radiation absorbed by the dianhydrohexitol on the basis of the colour change encompasses the determination of a pre-defined minimum exposure.

The method of the present invention also allows one to determine the quantity of the ionizing radiation exposure. In this case a representative sample can be exposed to a plurality of increasing doses of ionizing radiation. Alternatively, a plurality of representative samples is each exposed to a different dose of ionisation radiation. In both cases the plurality of colour changes that is observed can be used as a reference to determine the quantity of ionisation exposure for a sample whose exposure is unknown. The plurality of colour changes can be recorded as described above (e.g. as a colour chart) or a calibration curve can be prepared (e.g. see FIG. 2). The colour change of the sample being tested is compared with the colour change associated with the increasing dose of ionizing radiation to determine the actual dose received.

The reference may be one or more samples that have been pre-exposed to pre-defined doses of ionizing radiation. Alternatively, the reference may be a record of the colour changes associated with pre-defined doses of ionizing radiation. For example, the reference may be a colour chart or a data chart that allows one to correlate the colour change of an exposed sample with a particular level of exposure. Alternatively, the record may be stored electronically such that it is accessible (locally or remotely) to any electronic device used to detect or quantify the colour change. For example, if the device used to detect or quantify the colour change comprises a camera, the device can be configured to compare the colour change of the sample (directly or from a recorded image) with the electronically stored record so as to allow a correlation of the colour change of an exposed sample with a particular level of exposure.

5.5 Systems and Kits

The invention also provides systems and kits for detecting and optionally quantifying exposure to ionizing radiation. For example, the invention provides a system for detecting and optionally quantifying exposure to ionizing radiation comprising: a dianhydrohexitol or dianhydrohexitol-containing composition; and a means to determine if (i) the dianhydrohexitol or dianhydrohexitol-containing composition has been exposed to a pre-defined dose of ionizing radiation and optionally (ii) the quantity of the exposure that has occurred.

The dianhydrohexitol is as described previously and is preferably isosorbide. The dianhydrohexitol may be provided as part of a composition. The means to determine if the dianhydrohexitol has been exposed to a pre-defined dose of ionizing radiation and optionally the quantity of the exposure that has occurred can be a pre-exposed representative sample.

Alternatively, the dianhydrohexitol, or composition comprising a dianhydrohexitol, may be arranged or designed to create a message in words, symbols, codes or other patterns to alert a user that exposure to ionizing radiation has occurred. The means can alternatively be a record (e.g. colour chart or a data chart) that allows a user to correlate a colour change with a particular exposure. The means can also be a colorimetric, chromometric, spectrometric or EPR device as described above such as a tristimulus colorimeter, a spectrophotometer, a spectrocolorimeter, spectrometer or a densitometer optionally connected operably to a computer. Where a computer is used as part of the system, any commercially available or tailor-made software may be used to detect and optionally quantify the irradiation dosage.

The invention also provides a kit comprising a dianhydrohexitol or dianhydrohexitol-containing composition; and means to determine if the dianhydrohexitol or dianhydrohexitol-containing composition has been exposed to a pre-defined dose of ionizing radiation and optionally the quantity of the exposure that has occurred. The dianhydrohexitol is as described previously and is preferably isosorbide. The dianhydrohexitol may be provided as part of a composition. For example, the kit may comprise a dianhydrohexitol in the form of a plurality of pellets, tablets, rods, discs, or beads. The dianhydrohexitol may be provided in the form of a film, tape, fibre, fabric or badge. The means to determine if the dianhydrohexitol or dianhydrohexitol-containing composition has been exposed to a pre-defined dose of ionizing radiation and optionally the quantity of the exposure that has occurred can be a pre-exposed representative sample as described previously and as described for the system above.

5.6 Sterilisation

In a further aspect the invention provides a process for making sterilized objects. An exemplary process comprises the steps: (a) providing an object to be sterilized; (b) exposing the object and a dianhydrohexitol to ionizing radiation; (c) detecting the colour change in the dianhydrohexitol; (d) quantifying the dose of ionizing radiation absorbed by the dianhydrohexitol on the basis of the colour change; (e) confirming that the dose is a pre-defined amount suitable for sterilising; and (f) marking the object or packaging containing the object to indicate that it has been sterilized. The object can be sterilized and then packaged or packaged and then sterilized. Either way, the product directly obtained by the process is a packaged sterilized object. The sterilised object or the packaging is marked to indicate that the object is sterilized so as to avoid any confusion between sterilized and non-sterilized objects. The object to be sterilized can be a medical or research device, a pharmaceutical product, a food product or any other object that requires sterilization.

6. Advantages

Compared to existing technology such as that mentioned above, dianhydrohexitol-based materials do not need any specific pre-treatment or activation before or after usage and it provides a visual, easy and direct method to detect and quantify ionisation radiation exposure without requiring the use of complex analytical tools (although these can nevertheless be used) for the reading of the results. The use of isosorbide as the dianhydrohexitol is particularly preferred for the present invention as it is an abundant, easy to synthesize and proven non-toxic compound.

7. Other Remarks

In the context of the present application, the term 'comprising' is meant to introduce an open list, such that further unmentioned members are not excluded. However, the use of 'comprising' is intended to specifically characterize also the scenario, wherein no further unmentioned members are present. In other words, a disclosure of 'comprising' is to be understood as a disclosure of 'consisting of' as one distinct option.

In the context of the present application, the reference to a feature being a 'preferred' feature is meant to indicate that it is preferred to combine this feature with other preferred features of the present application. All such combinations of preferred features with other preferred features are meant to be directly and unambiguously disclosed.

Figure 4A:
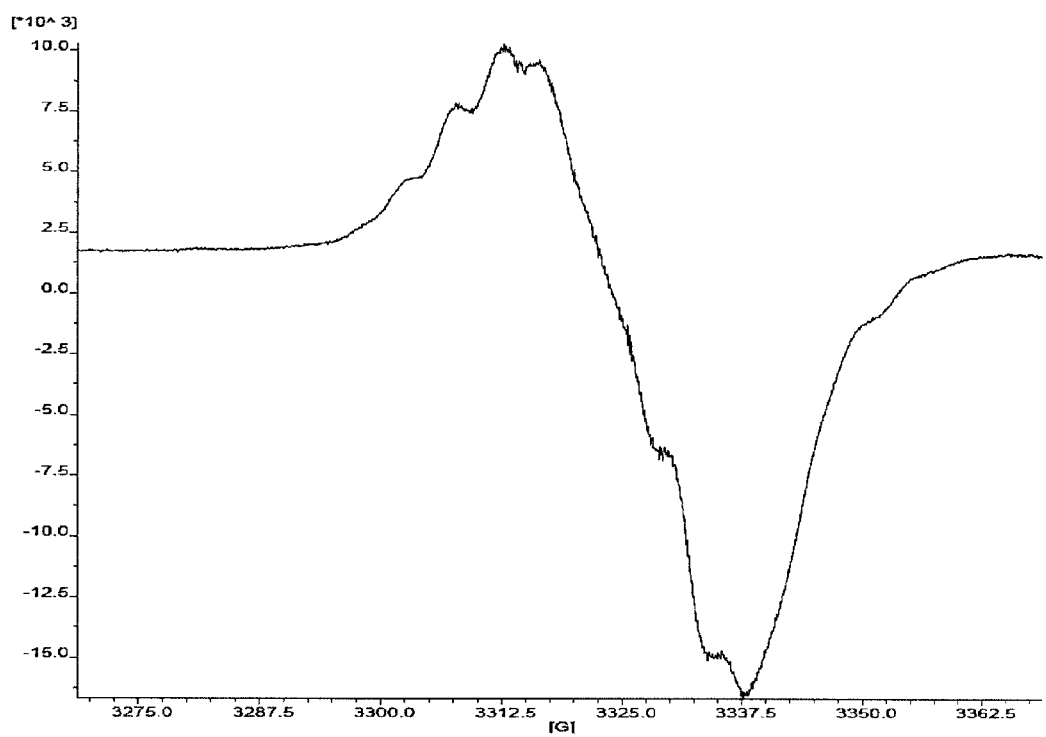
FIG. 4 depicts the EPR spectrum (recorded at 100K) of isosorbide (FIG. 4A), isoidide (FIG. 4B) and isomannide (FIG. 4C) after γ-ray irradiation (each exposed at 26.7 kGy).
Figure 4B:
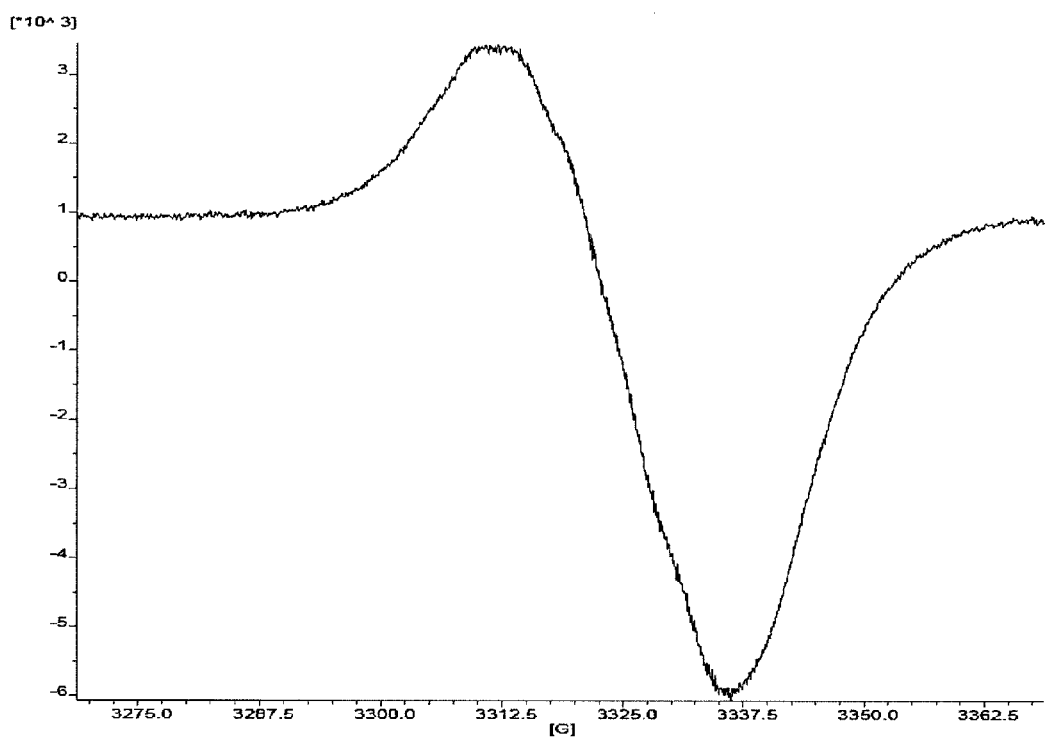
Figure 4C:
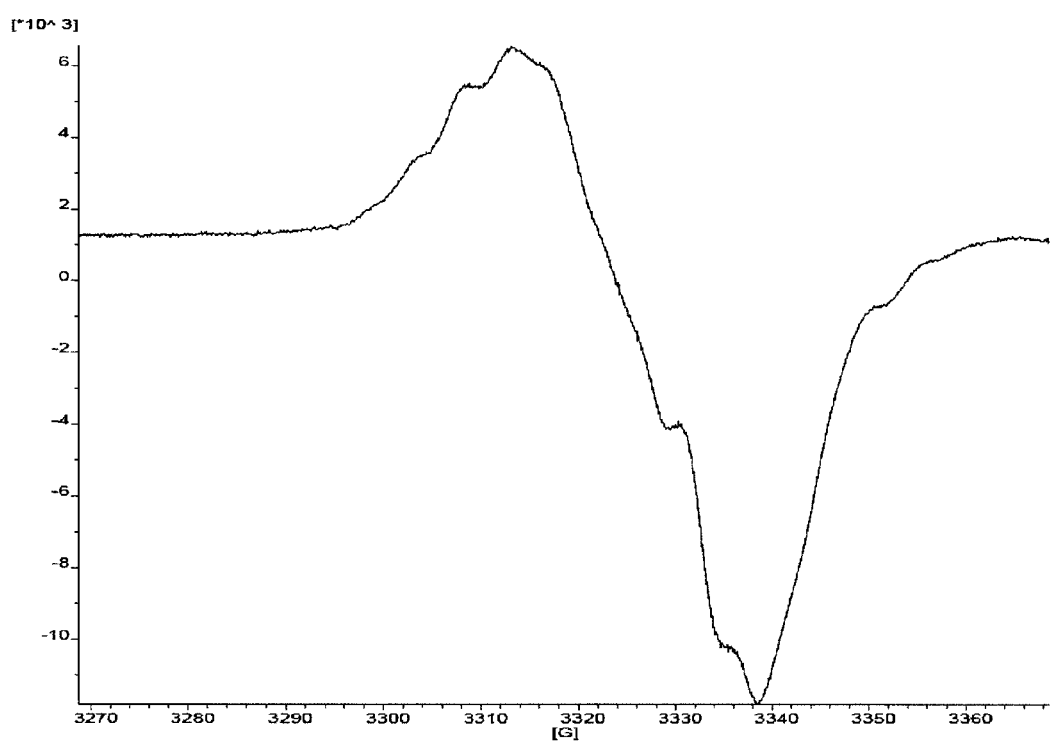
Figure 5A:
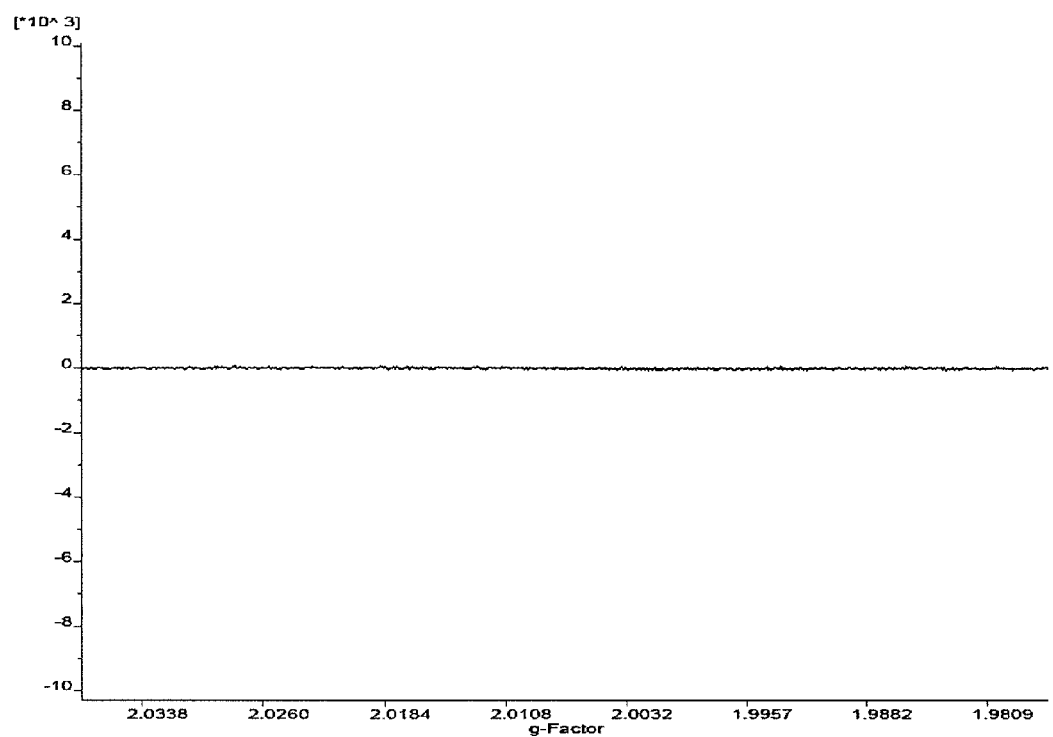
FIG. 5 depicts the EPR spectrum (recorded at 100K) for isosorbide after X-ray irradiation at 0 kGy (FIG. 5A—i.e. no exposure), 5.6 kGy (FIG. 5B), 25.5 kGy (FIG. 5C) and 45.2 kGy (FIG. 5D).
Figure 5B:
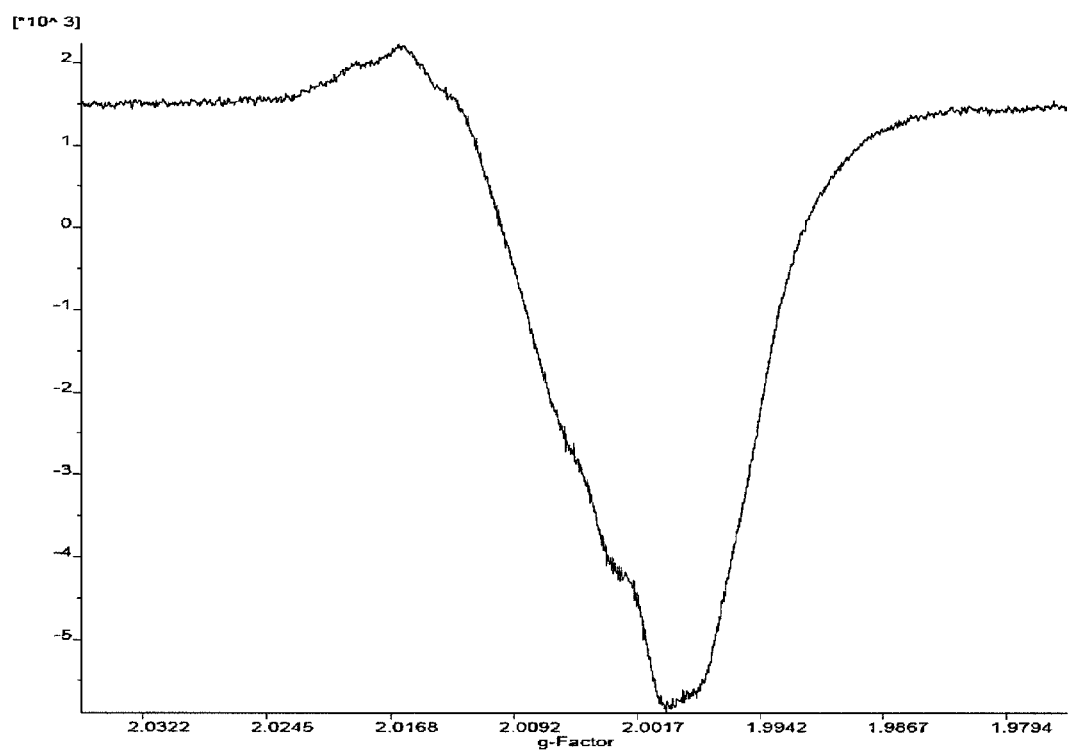
Figure 5C:
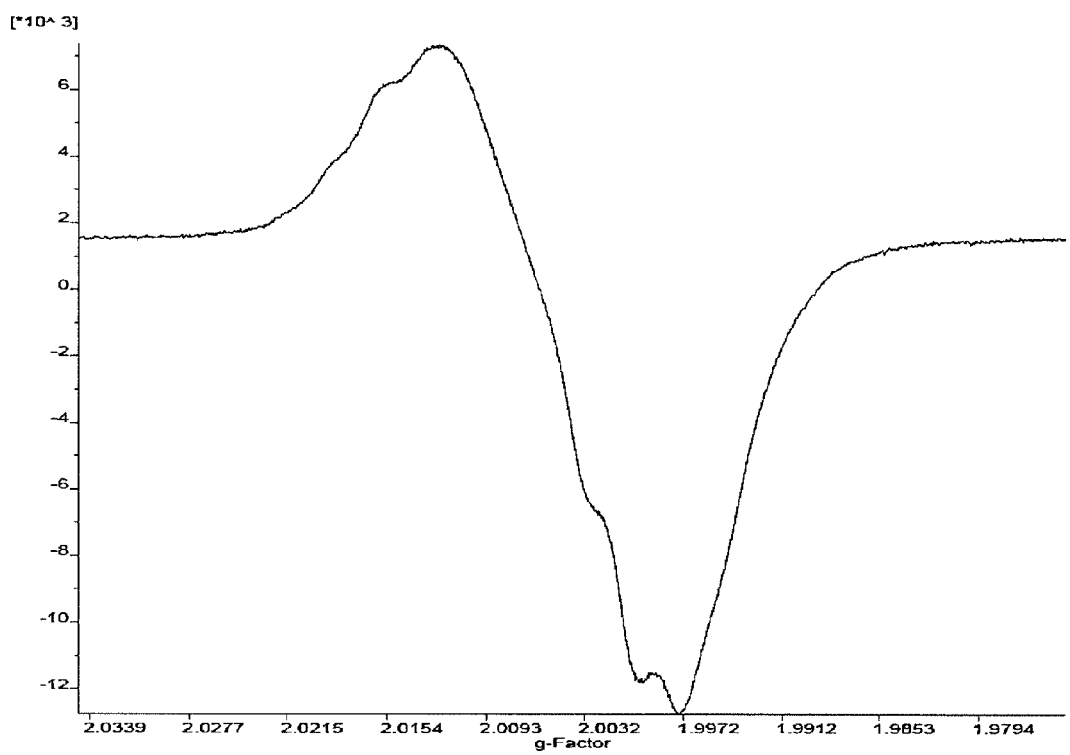
Figure 5D:
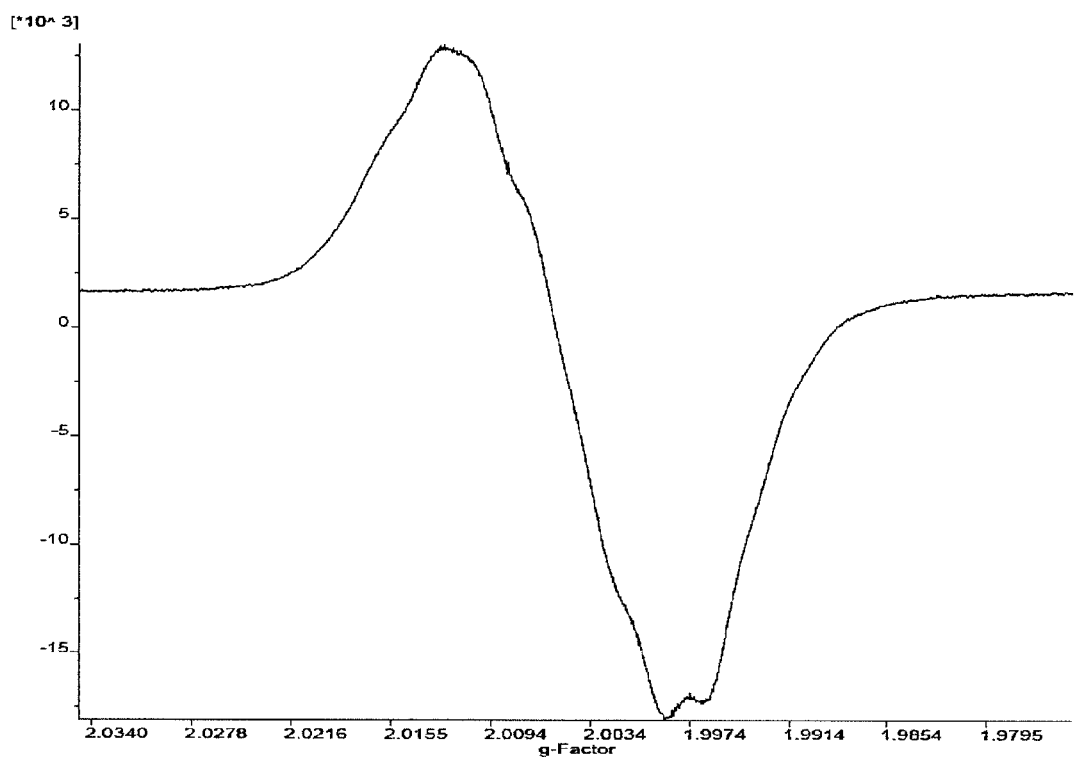

Furthermore, while the invention has generally been described on the basis of detecting a colour change in the exposed dianhydrohexitol, this is by no means the only physical or chemical parameter that can be monitored to determine exposure to ionizing radiation. For example, and as explained above, detection and optional quantifying of exposure to ionizing radiation can also be performed on the basis of the appearance of an electron paramagnetic resonance (EPR) signal after exposure of the dianhydrohexitol to ionizing radiation (see FIGS. 4 and 5). Such EPR methods are known to those skilled in the art and are already employed for alanine-based dosimeters. Thus, the invention also relates to a method for detecting and optionally quantifying exposure to ionizing radiation, comprising the steps: (a) providing a dianhydrohexitol or dianhydrohexitol-containing composition; (b) exposing the dianhydrohexitol or dianhydrohexitol-containing composition to ionizing radiation; (c) detecting a free radical in the dianhydrohexitol or dianhydrohexitol-containing composition by electron paramagnetic resonance (EPR); and optionally (d) quantifying the dose of ionizing radiation absorbed by the dianhydrohexitol on the basis of the change in EPR signal. The systems and kits as described herein can also be used for detecting and optionally quantifying exposure to ionizing radiation on the basis of an EPR signal. Alanine-based methods and dosimeters that can be modified to use a dianhydrohexitol or dianhydrohexitol-containing composition in accordance with the present invention are described, for example, in US 2005/0061991 and EP 1 315 002 A1.

8. INDUSTRIAL APPLICABILITY

The present invention can be used to detect and quantify exposure to ionisation radiation. The invention is suitable for use in medical, industrial and agricultural processes that require monitoring of exposure to ionizing radiation.

The invention claimed is:

1. A method for detecting and optionally quantifying exposure to ionizing radiation, comprising the steps:
 (a) providing a dianhydrohexitol or dianhydrohexitol-containing composition, wherein the dianhydrohexitol is one or more of isosorbide, isomannide and isoidide;
 (b) exposing the dianhydrohexitol or dianhydrohexitol-containing composition to ionizing radiation, thereby effecting a colour change in the dianhydrohexitol;

(c) detecting the colour change in the dianhydrohexitol or dianhydrohexitol-containing composition; and optionally (d) quantifying the dose of ionizing radiation absorbed by the dianhydrohexitol or dianhydrohexitol-containing composition on the basis of the colour change.

2. The method according to claim 1, wherein detecting the colour change is performed visually and the method further comprises the step of quantifying the dose of ionizing radiation by comparing the colour change with a reference to determine (i) if a pre-defined minimum exposure has occurred and optionally (ii) the quantity of exposure that has occurred.

3. The method according to claim 2, wherein the exposed dianhydrohexitol or dianhydrohexitol-containing composition is dissolved in a solvent and the step of detecting the colour change is performed on a solution of the exposed dianhydrohexitol or dianhydrohexitol-containing composition.

4. The method according to claim 2, wherein the dianhydrohexitol is isosorbide.

5. The method according to claim 1, wherein detecting the colour change is performed with a colorimetric, chromometric or spectrometric device and the method further comprises the step of quantifying the dose of ionizing radiation by comparing the colour change with a reference to determine (i) if a pre-defined minimum exposure has occurred and optionally (ii) the quantity of exposure that has occurred.

6. The method according to claim 5, wherein the exposed dianhydrohexitol or dianhydrohexitol-containing composition is dissolved in a solvent and the step of detecting the colour change is performed on a solution of the exposed dianhydrohexitol or dianhydrohexitol-containing composition.

7. The method according to claim 5, wherein the dianhydrohexitol is isosorbide.

8. The method according to claim 5, wherein the colorimetric device is a UV-vis spectrometer.

9. The method according to claim 8, wherein the exposed dianhydrohexitol or dianhydrohexitol-containing composition is dissolved in a solvent and the step of detecting the colour change is performed on a solution of the exposed dianhydrohexitol or dianhydrohexitol-containing composition.

10. The method according to claim 8, wherein the dianhydrohexitol is isosorbide.

11. The method according to claim 1, wherein the exposed dianhydrohexitol or dianhydrohexitol-containing composition is dissolved in a solvent and the step of detecting the colour change is performed on a solution of the exposed dianhydrohexitol or dianhydrohexitol-containing composition.

12. The method according to claim 11, wherein the dianhydrohexitol is isosorbide.

13. The method according to claim 1, wherein the dianhydrohexitol is isosorbide.

14. The method according to claim 1, wherein the ionizing radiation is X-ray or γ-ray.

15. A method for detecting and optionally quantifying exposure to ionizing radiation, comprising the steps:
(a) providing a dianhydrohexitol or dianhydrohexitol-containing composition, wherein the dianhydrohexitol is one or more of isosorbide, isomannide and isoidide;
(b) exposing the dianhydrohexitol or dianhydrohexitol-containing composition to ionizing radiation, thereby producing a free radical;
(c) detecting a free radical in the dianhydrohexitol or dianhydrohexitol-containing composition by electron paramagnetic resonance (EPR); and optionally
(d) quantifying the dose of ionizing radiation absorbed by the dianhydrohexitol or dianhydrohexitol-containing composition on the basis of the EPR signal.

16. The method according to claim 15, wherein the dianhydrohexitol is isosorbide.

17. A system for detecting and optionally quantifying exposure to ionizing radiation comprising:
a dianhydrohexitol; and
a means to determine if (i) the dianhydrohexitol has been exposed to a pre-defined dose of ionizing radiation and optionally (ii) the quantity of the exposure that has occurred.

18. A kit comprising:
a dianhydrohexitol or dianhydrohexitol-containing composition, wherein the dianhydrohexitol is one or more of isosorbide, isomannide and isoidide; and
a means to determine if (i) the dianhydrohexitol or dianhydrohexitol-containing composition has been exposed to a pre-defined dose of ionizing radiation and optionally (ii) the quantity of the exposure that has occurred.

19. A kit according to claim 18, which is for determining whether an object has been effectively sterilized, wherein the means is a colour chart and pre-defined dose of ionizing radiation is the minimum dosage required for effective sterilization.

20. A kit according to claim 19, wherein the pre-defined dose of ionizing radiation is 5 kGy or higher, preferably 20 kGy or higher, more preferably 25 kGy or higher.

* * * * *